United States Patent [19]
Yang

[11] Patent Number: 6,016,674
[45] Date of Patent: Jan. 25, 2000

[54] STEERING WHEEL LOCK AND AIR BAG ANTI-THEFT DEVICE

[75] Inventor: Paul Yang, Tainan, Taiwan

[73] Assignee: MSO Limited, Cyprus

[21] Appl. No.: 09/132,873

[22] Filed: Aug. 12, 1998

Related U.S. Application Data

[60] Provisional application No. 60/081,172, Apr. 9, 1998.

[51] Int. Cl.$^7$ .................................................. B60R 25/02
[52] U.S. Cl. ............................................... 70/209; 70/226
[58] Field of Search ........................... 70/209, 211, 212, 70/225, 226, 237, 238

[56] References Cited

U.S. PATENT DOCUMENTS

| | | | |
|---|---|---|---|
| 584,017 | 6/1897 | Sewell | 70/226 |
| 5,199,284 | 4/1993 | Lin | 70/209 |
| 5,275,030 | 1/1994 | Cole | 70/209 |
| 5,415,018 | 5/1995 | Ferrante | 70/209 |
| 5,454,240 | 10/1995 | Whitney | 70/209 |
| 5,537,847 | 7/1996 | Dalton et al. | 70/209 |
| 5,540,067 | 7/1996 | Kim | 70/209 |
| 5,555,753 | 9/1996 | Matlock | 70/209 |
| 5,566,560 | 10/1996 | LiCavsi | 70/18 |
| 5,595,078 | 1/1997 | Harrell | 70/209 |
| 5,636,538 | 6/1997 | Openiano | 70/209 |
| 5,706,681 | 1/1998 | Gorokhovsky | 70/209 |
| 5,713,229 | 2/1998 | Garcia et al. | 70/209 |
| 5,868,016 | 2/1999 | Duran, Sr. | 70/209 |
| 5,887,464 | 3/1999 | Perez | 70/209 |

FOREIGN PATENT DOCUMENTS

| | | |
|---|---|---|
| 2487275 | 7/1980 | France . |
| 680416 | 8/1939 | Germany . |
| 1127524 | 9/1968 | United Kingdom . |

*Primary Examiner*—B. Dayoan
*Assistant Examiner*—John B. Walsh
*Attorney, Agent, or Firm*—Robert C. Kain, Jr.

[57] ABSTRACT

The steering wheel lock and an air bag anti-theft device is adapted to fit atop a steering wheel having a hub, a plurality of spokes about a central hub axis and carrying an air bag thereon. The device includes a first and a second platform slidably engaged together. Each platform has, at opposing ends, an arcuate, steering wheel grip member with a substantially semicircular wheel grip face. Each grip face has an open mouth which faces inboard towards said central axis of said steering wheel. The device also includes first and second laterally spaced apart locking bars each carrying locking grooves. The locking bars are mounted on one of said first and said second platforms. Respective receiving channels hold and guide the first and second locking bars. The channels are formed on the other of said first and second platforms such that said locking bars slide in and out of said receiving channels in an unlocked mode. A key actuatable lock is mounted on said other of said first and second platforms. The lock includes a rotating armature acting upon two latches which move in opposite directions and mate with said locking grooves on said locking bars. The latches are biased to one of a locked or an unlocked position. In a preferred embodiment, the latches are biased to an open or unlocked position. Also, one locking bar is cylindrical and carries fine locking grooves thereon and the other locking bar is cylindrical and carries larger, circumferential locking grooves thereon. Accordingly, the fine grooves enable short, tight digital locking action on the steering wheel while the larger locking grooves provide superior locking support for the entire system. In an alternate embodiment, the fine locking grooves are omitted and the bar becomes a smooth faced, guide bar. In the alternate embodiment, the rotating armature moves a single latch. In both embodiments, depending pins capture steering wheel spokes therebetween and limit rotational movement of the entire system when placed on the steering wheel.

18 Claims, 10 Drawing Sheets

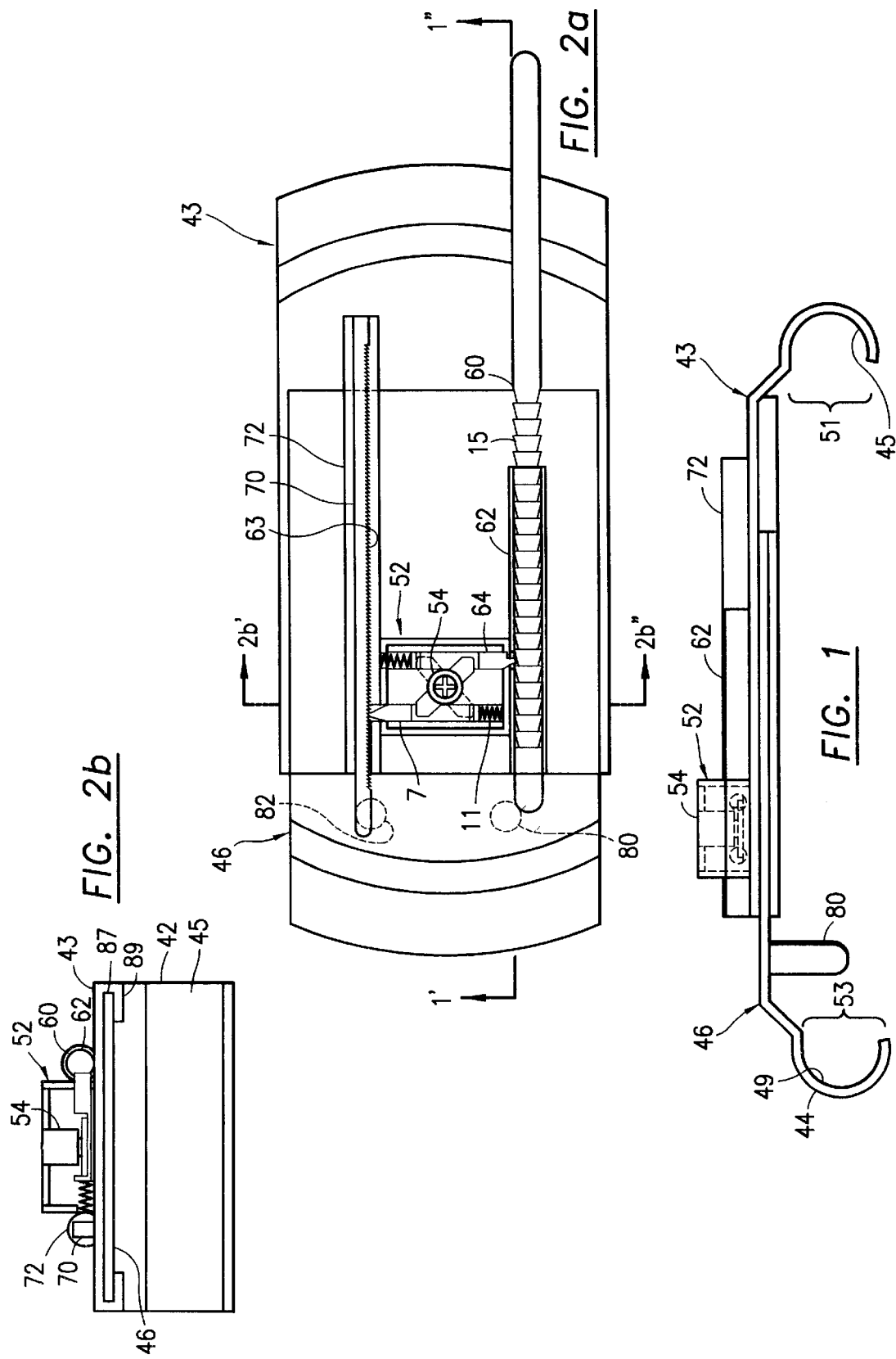

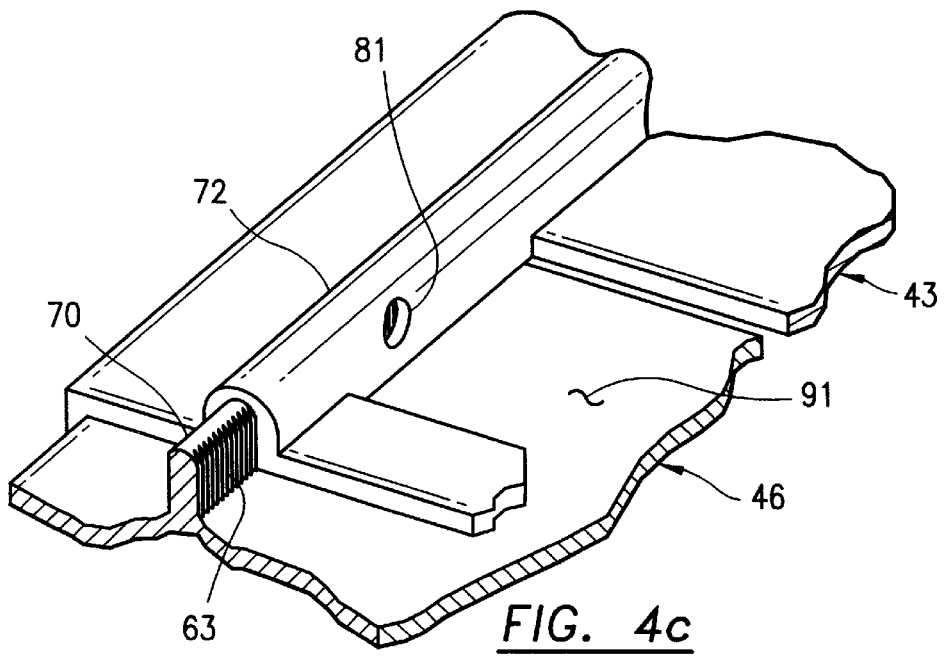
FIG. 4c
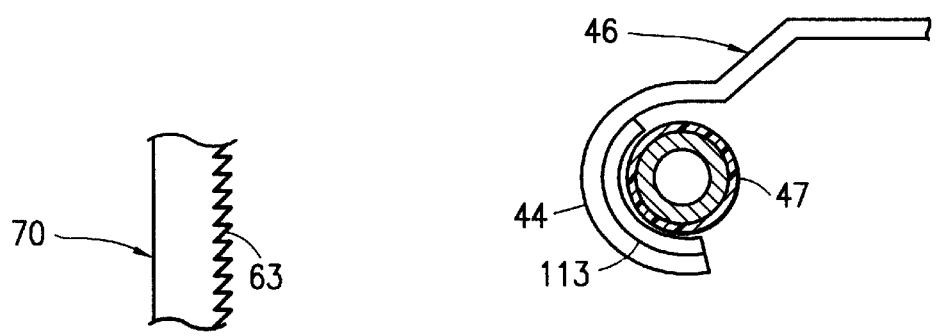
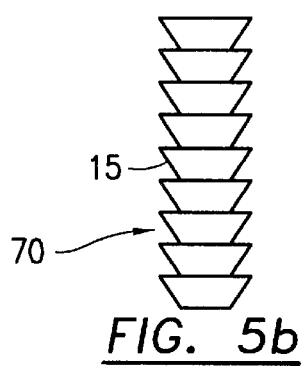
FIG. 5a
FIG. 5b
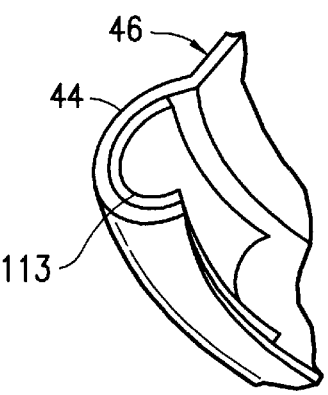
FIG. 10a
FIG. 10b

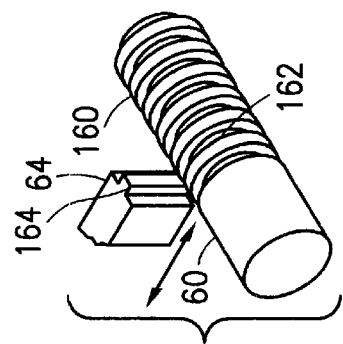
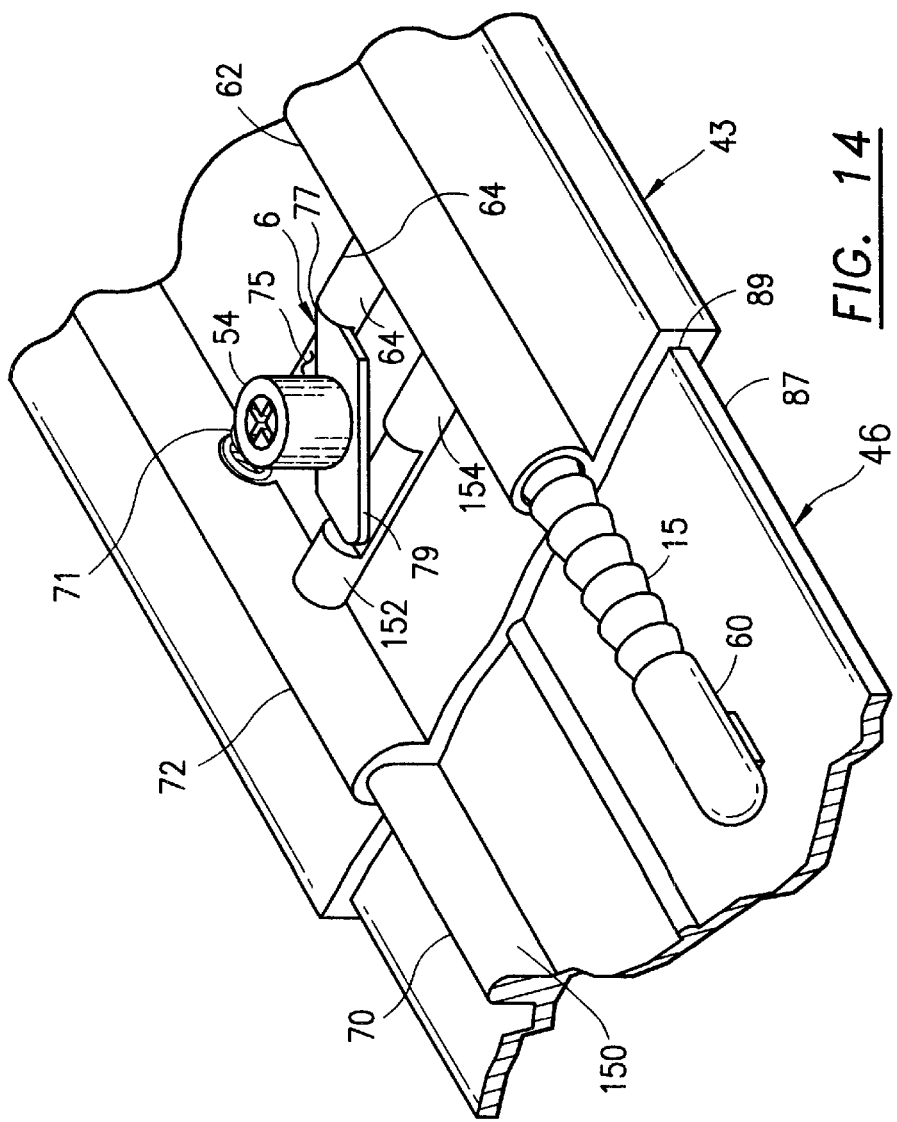

STEERING WHEEL LOCK AND AIR BAG ANTI-THEFT DEVICE

This is a regular patent application claiming the priority of provisional patent application Serial No. 60/081,172, filed Apr. 9, 1998.

TECHNICAL FIELD

The present invention relates to a steering wheel lock and an anti-theft device for an air bag.

BACKGROUND ART

Although many automobiles have steering wheels that automatically lock when the automobile is turned off, thieves sometimes break the internal steering wheel lock and steal the automobile. In addition, air bags carried in the steering wheel hub contain precious metals, particularly in the switch mechanism. Thieves sometimes rip open the air bag mechanism and steal the switches or other components which contain precious metals. U.S. Pat. No. 5,415,018 shows a clam shell steering wheel lock system. U.S. Pat. No. 5,454,240 shows a half-moon lock design with a single locking bar. U.S. Pat. No. 5,540,067 shows a rotatable half-moon steering wheel lock system.

DISCLOSURE OF THE INVENTION

The steering wheel lock and an air bag anti-theft device is adapted to fit atop a steering wheel having a hub, a plurality of spokes about a central hub axis and carrying an air bag thereon. The device includes a first and a second platform slidably engaged together. Each platform has, at opposing ends, an arcuate, steering wheel grip member with a substantially semicircular wheel grip face. Each grip face has an open mouth which faces inboard towards said central axis of said steering wheel. The device also includes first and second laterally spaced apart locking bars each carrying locking grooves. The locking bars are mounted on one of said first and said second platforms. Respective receiving channels hold and guide the first and second locking bars. The channels are formed on the other of said first and second platforms such that said locking bars slide in and out of said receiving channels in an unlocked mode. A key actuatable lock is mounted on said other of said first and second platforms. The lock includes a rotating armature acting upon two latches which move in opposite directions and mate with said locking grooves on said locking bars. The latches are biased to one of a locked or an unlocked position. In a preferred embodiment, the latches are biased to an unlocked position. Also, one locking bar is square or rectangular and carries fine locking grooves thereon and the other locking bar is cylindrical and carries larger, circumferential locking grooves thereon. Accordingly, the fine grooves enable short, tight digital locking action on the steering wheel while the larger locking grooves provide superior locking support for the entire system. In an alternate embodiment, the fine locking grooves are omitted and the bar becomes a smooth faced, guide bar. In the alternate embodiment, the rotating armature moves a single latch. In both embodiments, depending pins capture steering wheel spokes therebetween and limit rotational movement of the entire system when placed on the steering wheel.

BRIEF DESCRIPTION OF THE DRAWINGS

FIG. 1 diagrammatically illustrates a side view of the steering wheel lock and air bag anti-theft device from the perspective of section line 1'–1" in FIG. 2a.

FIG. 2a diagrammatically illustrates a top view of the steering wheel lock and air bag anti-theft device.

FIG. 2b diagrammatically illustrates a side view of the lock from the perspective of section line 2b'–2b" in FIG. 2a. In FIGS. 1–2b, certain elements of the device are cut-away to reveal the important features of the present invention.

FIGS. 4a, 4b, 4c, 4d and 4e diagrammatically illustrate details of the lock mechanism and the locking bars.

FIGS. 5a and 5b illustrate the fine and coarse locking grooves on the locking bars.

FIGS. 10a and 10b illustrate the use of spacers to mount the lock onto smaller steering wheels.

FIG. 14 diagrammatically illustrates details of the lock mechanism, the singular locking bar and the smooth guide bar.

FIG. 15 diagrammatically illustrates a coarse locking bar with square grooves and a complementary tooth on the lock piece.

BEST MODE FOR CARRYING OUT THE INVENTION

Figure 3:
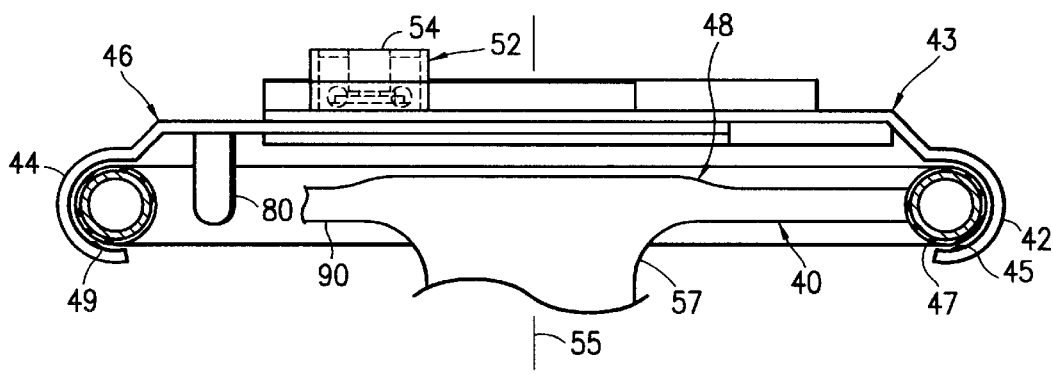
FIG. 3 diagrammatically illustrates the lock mounted on a steering wheel hub over an air bag.

FIG. 1 diagrammatically illustrates a side view of the steering wheel lock and air bag anti-theft device from the perspective of section line 1'–1" in FIG. 2a. FIG. 2a diagrammatically illustrates a top view of the steering wheel lock and air bag anti-theft device. FIG. 2b diagrammatically illustrates a side view of the lock. In FIGS. 1, 2a and 2b, certain elements of the device are cut-away to reveal the important features of the present invention. FIG. 3 shows the device mounted on steering wheel 40 which carries air bag 48.

Platform 43 has a semi-circular edge 42 which is open at its radially inboard end to capture steering wheel 40 therein. Second platform 46 has a similar semi-circular edge 44 which is open at a radially inboard end to capture a portion of the steering wheel 40 therein. The second platform slides beneath the first platform in a tongue and groove fitting. See FIG. 2b. Accordingly, interfitting and slidable members are established on both platforms.

Figure 8:
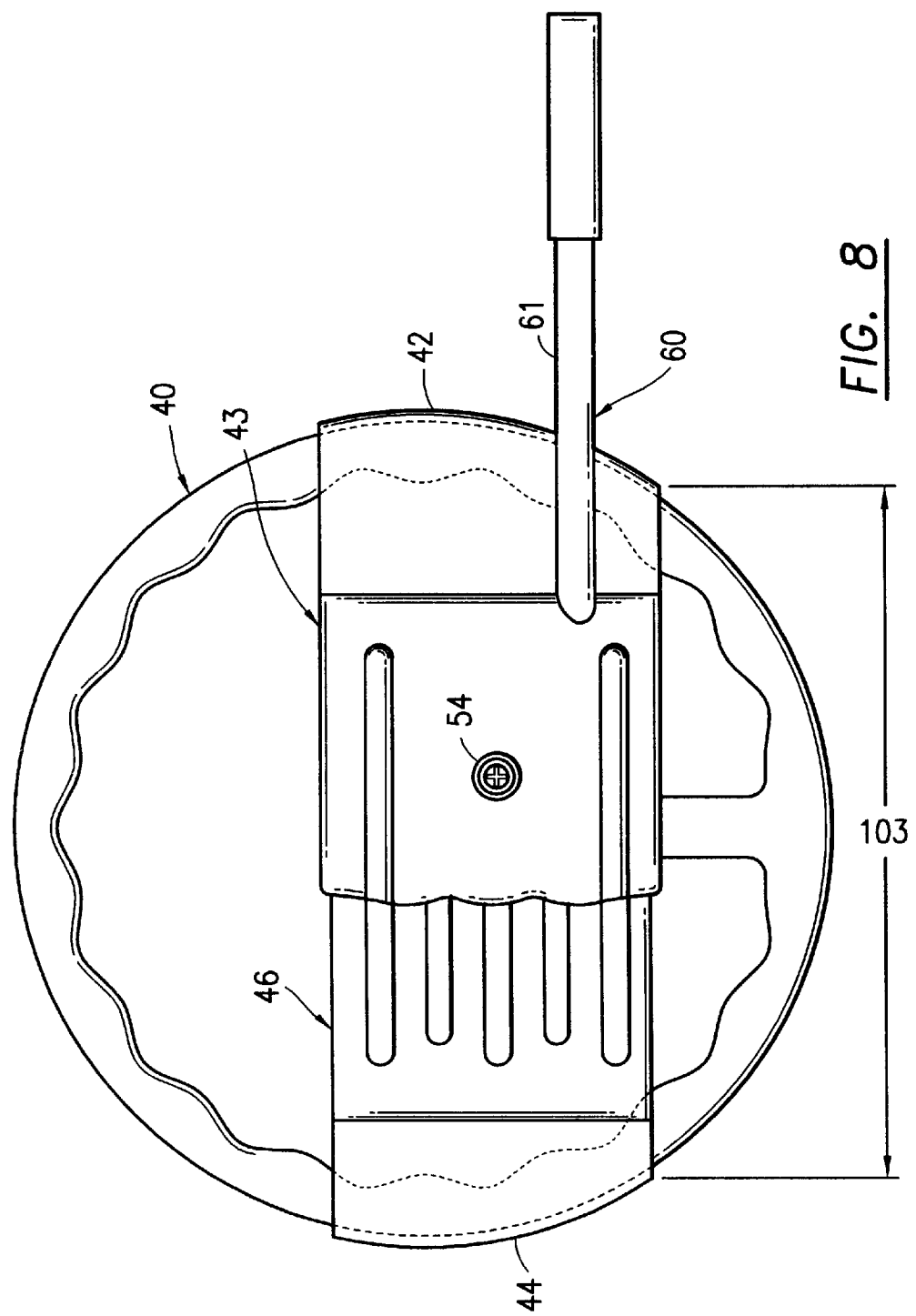

As shown in FIG. 8, steering wheel lips 42, 44 only partially extend in an arc (approximately a 30 degree arc) about generally opposing arcuate sides of the total periphery of the steering wheel 40.

Additionally, plate 43 slides over plate 46 based upon guide and lock bars 70, 60. Lock bar 60 has a plurality of notches or circular grooves 15 into which a lock piece 64 protrudes from lock 52. Lock 52 has a protective wall (four vertical walls and a horizontal top plate (see FIG. 2*b*)) and a vertically protruding cylindrical lock 54. As shown in FIG. 2*b*, the vertical top face of cylindrical lock 54 is flush with the top cover plate of the protective body. (See also FIGS. 7 and 8.) The lock piece actuator 6 (shown in the locked mode as a solid line and an unlocked mode as a dashed line) rotates counterclockwise upon insertion of the unique key into the cylindrical lock 54. Springs 11 bias the appropriate lock piece actuator 6 legs to move lock piece 64, 7 towards the locking notches on lock bar 60 and lock bar 70.

Bar 70 also carries locking grooves. Alternatively, the guide bar may be smooth. Bar 70 rides in guide member 72. The interfit of bar 70 and member 72 is shown in FIG. 2*b*.

Figure 6:
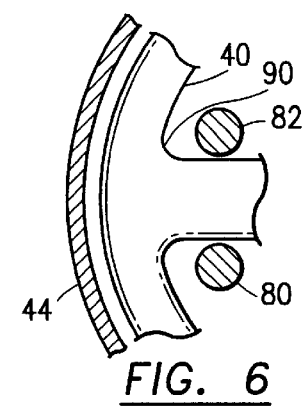
FIG. 6 illustrates a partial, broken away view of the steering wheel grip face, a portion of the steering wheel and the depending positional pins trapping the steering wheel spoke.

To limit rotational movement, plate 46 includes depending posts 80, 82 which trap cross piece 90 (see FIGS. 3 and 6) of the steering wheel 40 therebetween.

The lock 54 may be a four edge or X-shaped key lock.

As shown in FIG. 8, locking bar 60 has an extending arm 61 that limits rotational movement of the steering wheel 40 when the lock is placed on the wheel 40. Extending arm 61 abuts the windshield, dash board or other fixed structure in the automobile thereby thwarting thieves. Plates 43, 46 cover air bag 48 and limit the ability of a thief to cut the cover of the bag 48 and remove precious metals from the switch, the bag and other valuable components of the air bag.

Figure 7:
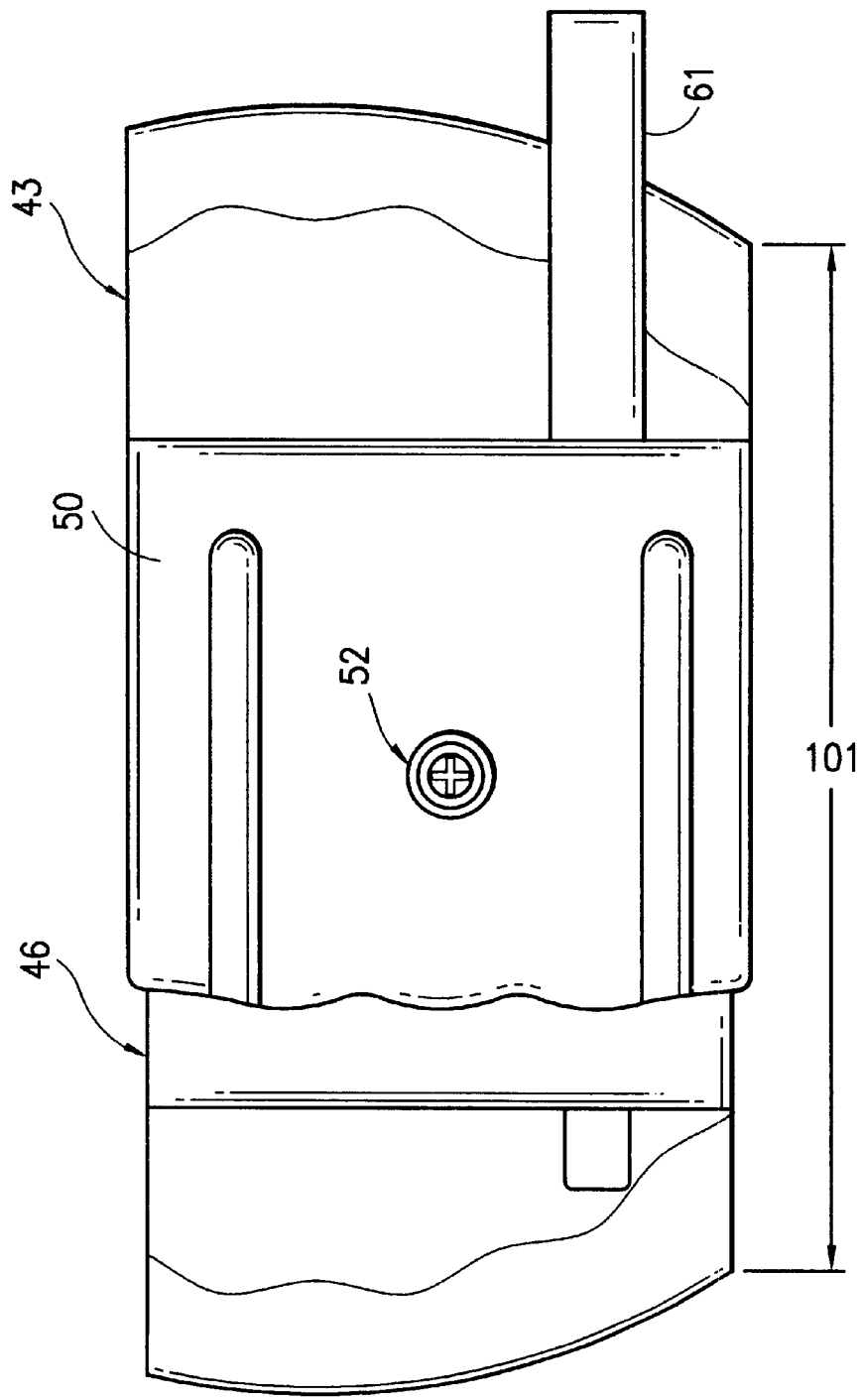
FIGS. 7 and 8 diagrammatically illustrate the lock in an unmounted state (collapsed and compact) and a mounted state (on the steering wheel), respectively.

FIG. 7 shows the steering wheel lock and air bag anti-theft device, when configured in an unmounted state, is very compact. Extension arm 61, mounted to plate 43, is moved inboard towards plate 46 such that its end protrudes from the opposite side of plate 46. Plate 46 collapses towards plate 43 such that compact lock dimension 101 is significantly less than steering wheel lateral dimension 103 (FIG. 8). It should be noted that cover plate 50 (FIG. 7) rises above plate 43 and protects the locking mechanism and the lock bar 60 and the bar 70.

Further details of the invention follow. There are several ways to configure the steering wheel lock and air bag anti-theft device. For example, if the steering wheel is located on the left side of the automobile (American style), the coarse locking bar will, most likely, extend to the right such that end 61 (FIG. 8) is disposed, in a locked mode, adjacent the windshield or dashboard. If the steering wheel is located on the right side of the automobile (British style), the coarse locking bar extends to the left to abut the windshield. The coarse locking bar may be affixed to the top, slidable platform or may be independently mounted and slidable with respect to the top platform. With an independent bar 60 (FIG. 2*a*), the bar pulls to the left of the figure and is used in a British style automobile. Hence, the lock system can be reversed for British or American style automobiles by switching the coarse lock bar 60 and the associated lock piece or latch.

FIGS. 1–3 are discussed concurrently herein. In a preferred embodiment, first platform 43 includes an arcuate, steering wheel grip member 42 having a semi-circular wheel grip face 45. Preferably, grip face 45 is substantially semi-circular in order to capture a radially outer portion of steering wheel periphery 47 shown in FIG. 3. Second platform 46 has an opposing, arcuate, steering wheel grip member 44. Steering wheel grip member 44 includes a grip face 49. Grip faces 45, 49 include open mouths 51, 53 that face inward or inboard toward central axis 55 (FIG. 3) of steering wheel hub 57.

Locking bars 60, 70 carry a plurality of locking grooves 15, 63. Locking groove 15 is a coarse locking groove and is generally circumferential with respect to cylindrical locking bar 60. In contrast, locking grooves 63 on bar 70 are fine tooth locking grooves and are disposed on only one face of the rectangular locking bar 70. As shown in FIG. 2*b*, locking bar 60 has a circular or cylindrical cross section and locking bar 70 has a rectangular cross section. Other cross-sectional shapes may be utilized. Both these locking bars act as guide bars since the bars are slidably disposed in receiving channels 62, 72.

Figure 4A:
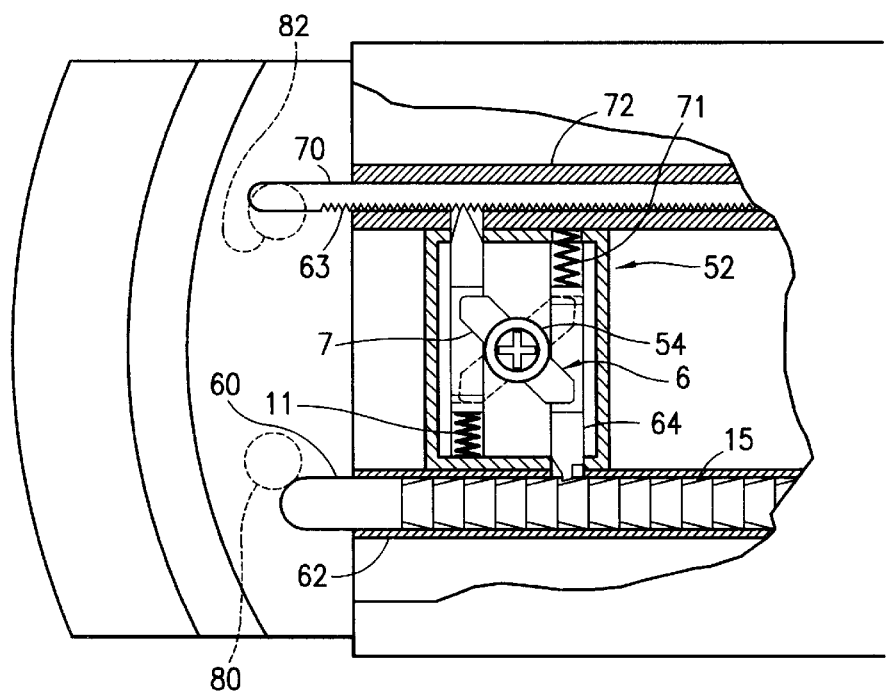

As shown in FIGS. 2*a* and 4*a*, lock 52 includes a rotating armature or lock piece actuator 6. In FIG. 2*a*, armature 6 is shown in solid lines in a locked mode and in broken lines in an unlocked mode. Hence, the armature visually appears as an X-shape which shows the locked and unlocked positions. In the detail view of FIG. 4*a*, armature 6 is shown in a locked mode. In a locked mode, armature 6 forces slidable latch piece 64 toward coarse locking bar 60 carrying locking grooves 15. In the same mode, armature 6 forces slidable latch piece 7 into fine tooth locking groove 63 on locking bar 70. Springs 11, 71 preferably bias latches 64, 7 to an unlocked position. In other words, springs 11, 71 are in an expanded or extended mode as shown in FIG. 4*a*. The springs may bias the latches in the opposite direction.

Figure 4D:
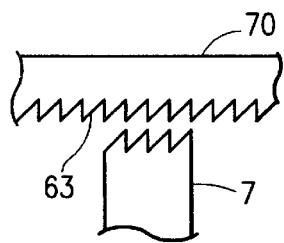
Figure 4E:
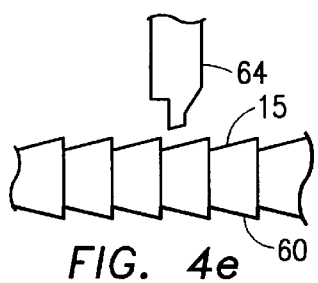
Figure 4B:
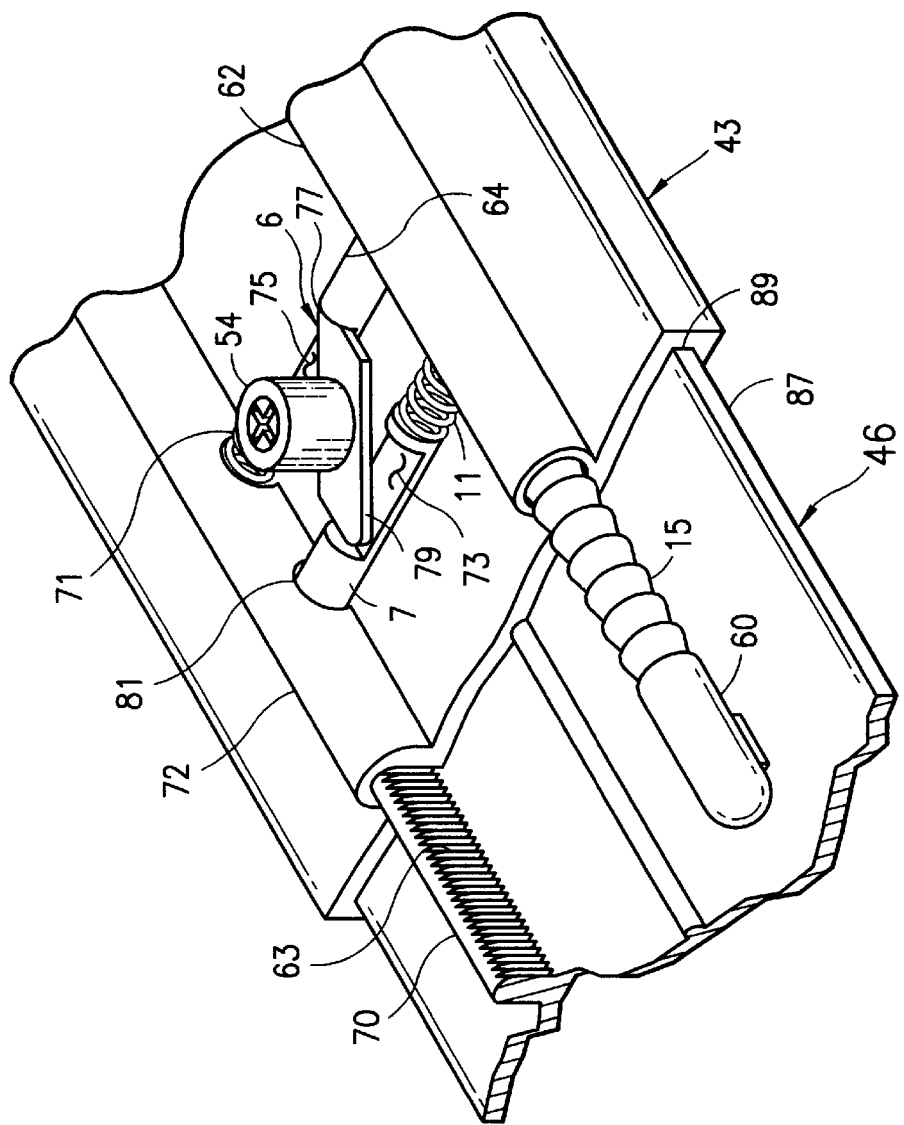

FIG. 4*b* diagrammatically illustrates a perspective, broken away view of the locking mechanism. FIGS. 4*d* and 4*e* show the special design for latches and lock bar pairs 7, 63 and 64, 15, respectively for the lock bars 70, 60. In FIG. 4*b*, latch or lock pieces 7, 64 are generally cylindrical in shape but include cut-outs 73, 75 within which armature legs 77, 79 move. The latches may have different cross-sectional shapes. The locking ends of actuator latches 7, 64 are captured within cylindrical holes in receiving channels 72, 62. With respect to actuator latch 7, cylindrical hole 81 in receiving channel 72 positions actuator 7 in a position normal to locking bar 70. This perpendicular position of the latch enhances lock security. The locking faces for lock bar system 70 have a perpendicular face with a sawtooth cut-out. The lock bar system 60 has a cylindrical cone locking face and a generally square tooth formed at the end of the lock piece 64. See FIGS. 4*d* and 4*e*.

As shown in FIG. 4*b* and in the other FIGS. 1, 2*a* and 2*b*, locking bar 70 is mounted to second platform 46. The bar may be an integral part of the platform. In one embodiment, locking bar 60 is also mounted to second platform 46. Locking bars 60, 70 are closely retained by receiving channels 62, 72. The receiving channels are formed on platform 43. In another embodiment with a right-handed extendible bar, the locking bar 60 moves independently in channel 62 with respect to platforms 43, 46. See FIGS. 11*a*, 11*b*, 12*a* and 12*b*.

As shown in FIG. 2*b*, platform 46 slides beneath platform 43 in a tongue and groove fit. In one embodiment, platform 46 includes tongue 87 which fits within groove 89 formed in platform 43.

FIG. 4*c* diagrammatically illustrates locking bar 70 having fine locking teeth 63 mounted onto second platform 46. Cylindrical hole 81 enables the locking end of actuator or latch 7 to lock into one of the fine locking grooves on locking bar 70.

In order to reduce the cost of manufacturing, locking unit 52 may be dropped or placed into cut-out 91 in platform 43. Since lock unit 52 has vertical, box-like walls (see FIGS. 1, 2a and 2b), a top, smooth cover plate 50 (FIGS. 7 and 8) may be disposed in a flush position relative to the upper vertical edge face of the lock unit 52. The integrated cover plate 50 and lock unit may be affixed to lower platform 43 by welding, soldering, rivets, locking screws or other common attachment mechanisms. In this manner, the integrated unit (cover 50 and lock unit 52) is placed on platform 43 and lock unit 52 is dropped into cut-out 91. Thereafter, platform 43 is permanently affixed to the integrated unit of cover 50 and lock 52. This reduces manufacturing costs and increases the security and stability of the steering wheel lock.

FIGS. 5a and 5b diagrammatically illustrate fine locking grooves 63 and coarse locking grooves 15. In operation and in reference to FIGS. 2a and 3, platform 46 is placed over a portion of the steering wheel periphery. Depending legs 80, 82 capture one of the steering wheel spokes 90 therebetween. Thereafter, the user slides platform 43 over platform 46. Gross or coarse locking bar 60 provides superior strength to the overall locking system. However, fine locking ability and a tight fit is provided by fine locking teeth 63 of locking bar 70. As shown by visually comparing the locking teeth in FIGS. 5a and 5b, there are a plurality (approximately 3) fine locking teeth in bar 70 for each gross locking channel in locking bar 60. The fine teeth have a normal tooth face and a slope face. Other locking teeth designs (i.e., channels, saw teeth, finely defined curvilinear teeth) may be utilized. Therefore, the user can tighten the locking device utilizing fine locking teeth 63 on locking bar 70. Enhanced security and system strength is provided by bar 60.

FIGS. 7 and 8 show enhanced cover systems for the lock. These smooth cover systems limit the ability of thieves to break the lock.

Figure 9:
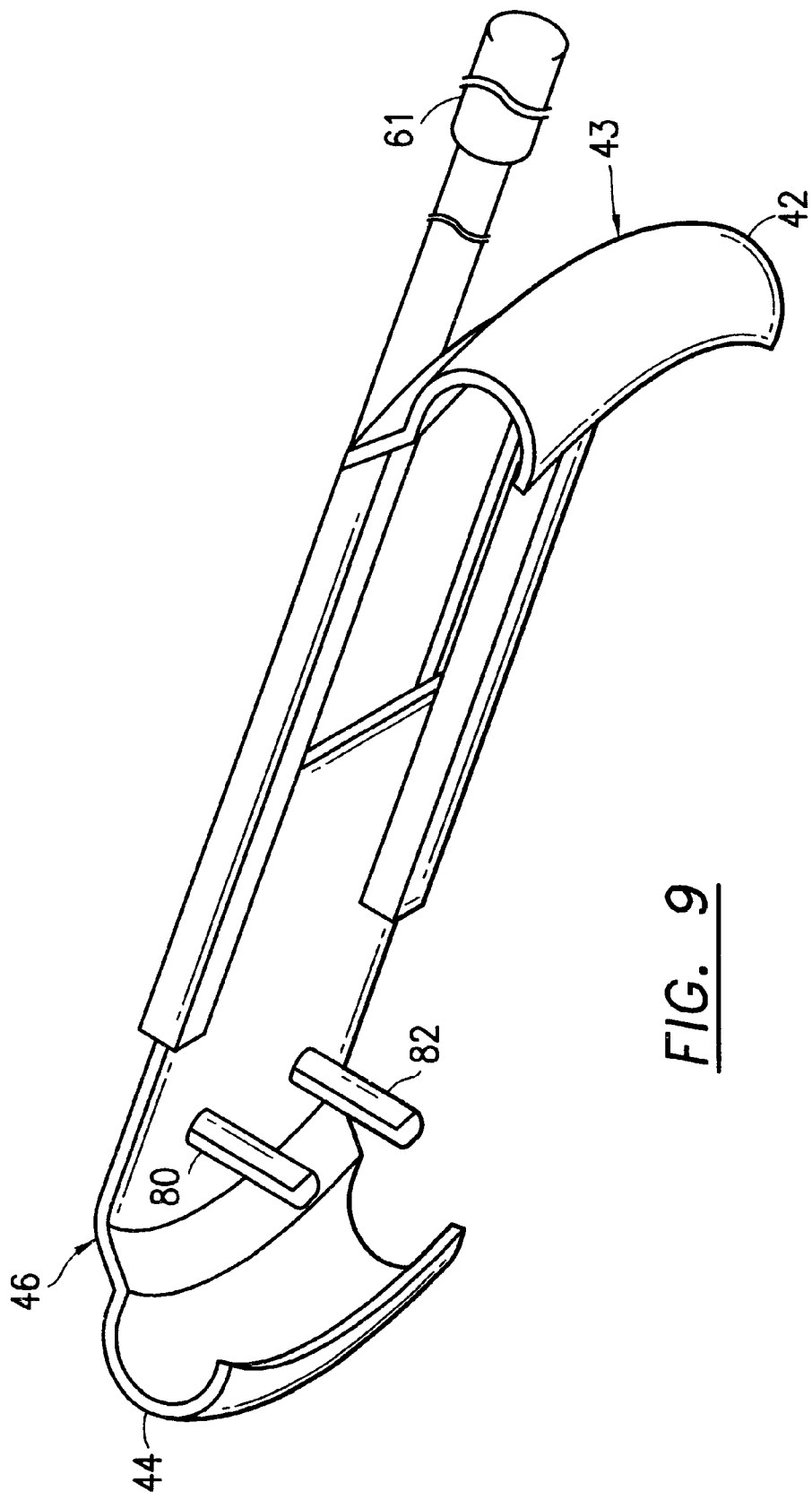
FIG. 9 illustrates the underside of the lock.

FIG. 9 diagrammatically illustrates the underside of the locking system and particularly the tongue and groove mechanism.

FIGS. 10a and 10b shown the use of spacers 113 to trap smaller cross-sectional dimensional steering wheels 47. Spacers 113 have complimentary semi-circular and arcuate dimensions and shapes as compared with wheel grip faces 45, 49. The arcuate dimension of the steering wheel lock is diagrammatically illustrated in FIG. 8. This figure shows that the steering wheel platform arc spans approximately 30 degrees.

FIGS. 11a, 11b, 12a and 12b diagrammatically illustrate a working embodiment of the present invention. In this embodiment, coarse locking bar 60 moves independently with respect to both platforms 43, 46. The user pulls bar 60 to the right in FIG. 11a until the bar end 61 (FIG. 8) abuts the window or dashboard of the automobile. Accordingly, the coarse locking teeth 15 have small frustoconical ends near the extended end 61 of bar 60. The larger frustoconical lock face ends are opposite and generally face away from extended end 61 (FIG. 8). The user unlocks the cylindrical lock 54, lock pieces 7, 64 pull away from locking grooves 15, 63 and the user extracts or inserts bar 60 into or out of receiving channel 62. If the steering wheel lock is to be removed, the user inserts bar 60 and radially opens or laterally moves platform 43 away from platform 46.

To lock the unit, the user radially closes platform 43 over platform 46, thereby trapping steering wheel segments therein. See. FIG. 3. Fine teeth 110 on locking bar 70 in FIG. 12a permit the user to tighten the platforms together. The interlocking teeth 110, 112 have normal teeth faces opposite the locking direction shown by arrow 114. The other tooth face is sloped to enable the user to tighten the lock by permitting lock piece latch 7 to travel over locking bar 70.

Figure 11A:
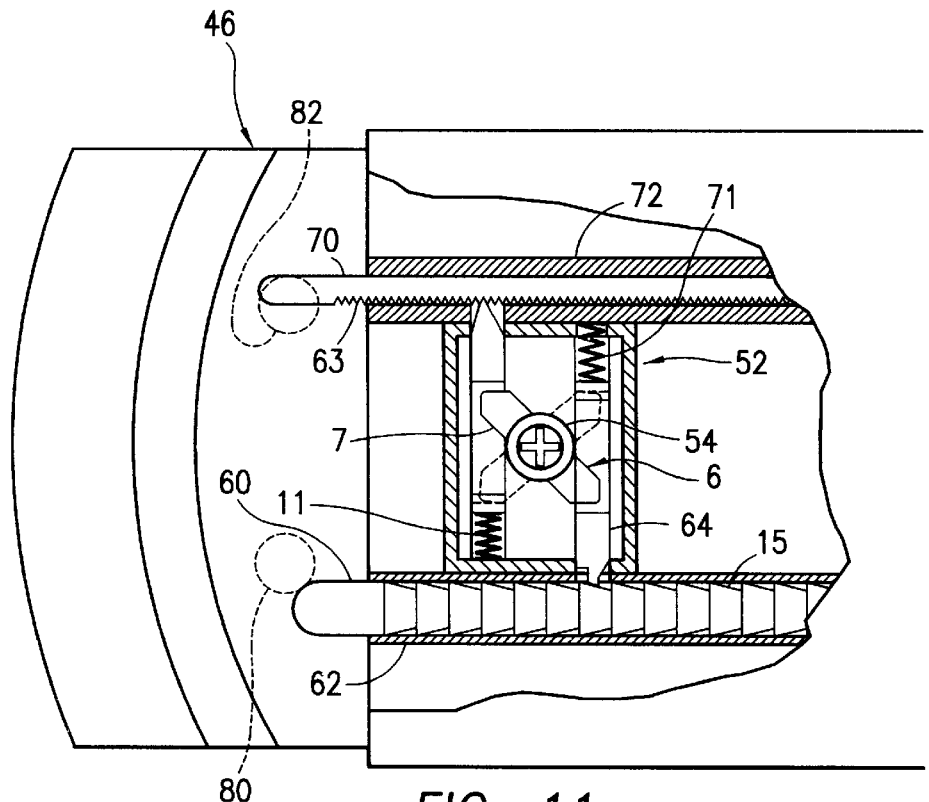
FIGS. 11a and 11b diagrammatically illustrate details of the locking mechanism with an independently mounted coarse locking bar.
Figure 11B:
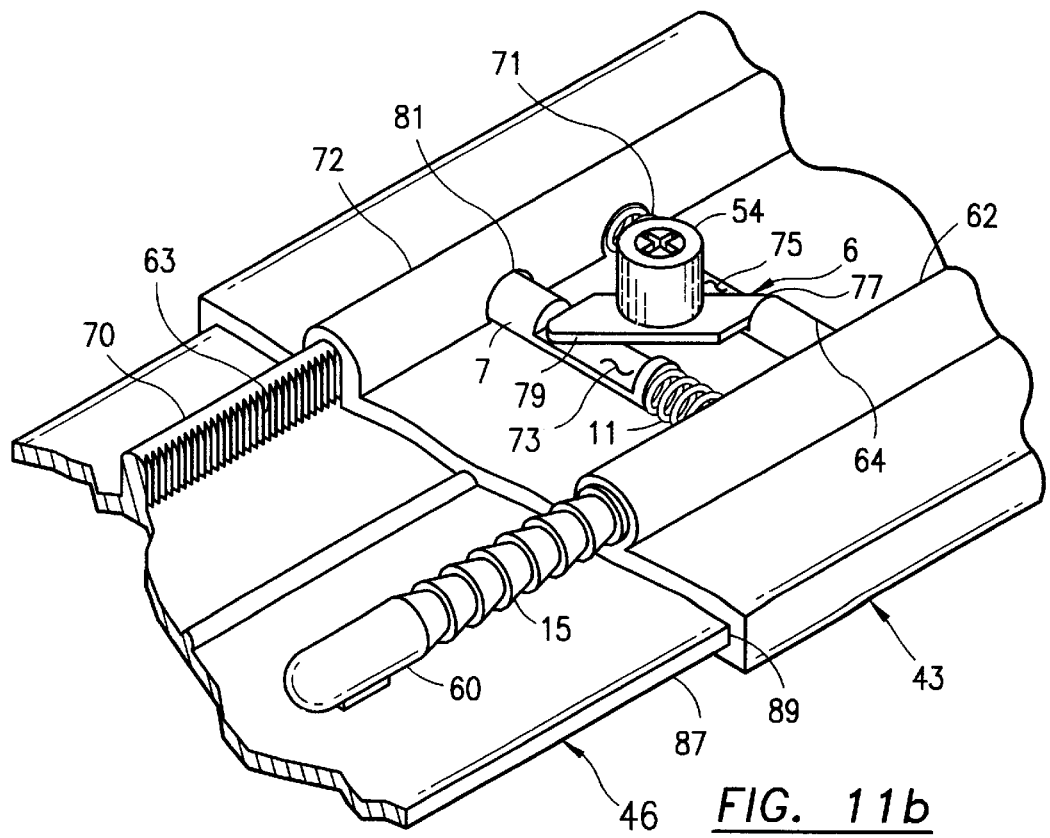
Figure 12A:
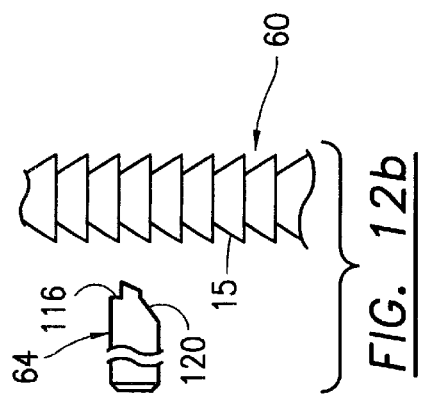
FIGS. 12a and 12b diagrammatically and respectively illustrate locking teeth on the fixed locking bar and corresponding teeth on the laterally moveable lock piece and coarse locking teeth on an independently mounted locking bar and the corresponding laterally moveable lock piece.
Figure 12B:
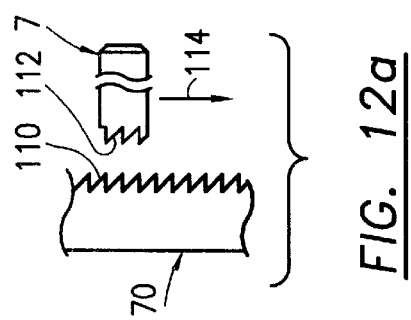

Lock piece 64 has a rectangular or square tooth with a longitudinal face 116 aligned with the locking direction 118 and a slope face 120 upstream from locking direction 118. The slope face 120 enables the user to withdraw bar 60 until extending end 61 (FIG. 8) abuts another fixed structure in the automobile. FIG. 11b shows the opposite free end of locking bar 60.

Since the steering wheel lock can be used on American style cars and British style cars, the extendible locking bar 60 can be withdrawn, the locking latch 64 flipped over and the bar 60 inserted from the left rather than the right as shown herein. Also, platform 43 may retain the fine tooth locking bar and platform 46 carry receiving channel 62 for bar 60.

Figure 13:
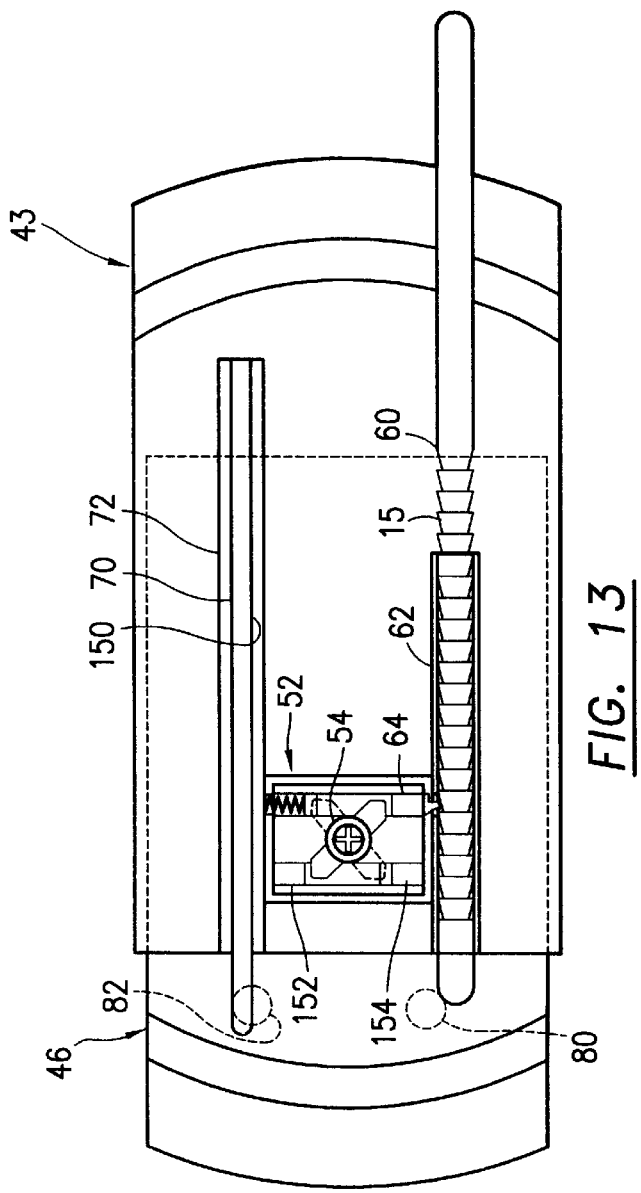
FIG. 13 diagrammatically illustrates a top view of an alternate embodiment of the steering wheel lock and air bag anti-theft device with a smooth guide bar.

FIGS. 13 and 14 diagrammatically illustrate an alternate embodiment of the present invention wherein a smooth face guide bar 70 is utilized. Bar 70 has a smooth face 150 and the bar is closely interfit into a channel in guide member 72 formed on platform 43. Since the face 150 is smooth, there is no need for a laterally moving lock piece or latch 7. Instead, rotating lock actuator (arm 79, FIG. 14) moves between fixed stops 152, 154 or moves freely (without stops) in the space. Also, if a single locking bar 60 is utilized, that bar is affixed to platform 46 such that the top platform 43 can slide over the bottom platform 46 and capture the steering wheel beneath the interfitting platforms and the locking bar 60. Particularly, the grooves 15 mate with the tooth on the locking piece or latch 64 to lock the two platforms and the bar together. The end of the locking bar protrudes a significant distance away from the steering wheel such that the wheel does not move when locked.

FIG. 15 illustrates locking bar 60 with square shaped grooves which are radially disposed about the periphery of the locking bar. The grooves are formed of square ridges 160 and square cut-outs 162 formed or configured on bar 60. A square tooth 164 matches the square grooves and protrudes from lock piece 64. As described earlier herein, lock piece 64 moves towards and away from locking bar 60.

The claims appended hereto are meant to cover modifications and changes withing the scope and spirit of the present invention.

What is claimed is:

1. A steering wheel lock and an air bag anti-theft device adapted to fit atop a steering wheel having a hub, a plurality of spokes about a central hub axis and carrying an air bag thereon, said device comprising:

a first and a second platform slidably engaged together, each said platform having, at opposing ends, an arcuate, steering wheel grip member having a substantially semicircular wheel grip face, each grip face having an open mouth facing inboard towards the other, opposing open mouth of the opposing platform;

first and second laterally spaced apart locking bars respectively carrying a large plurality of coarse and fine locking grooves, said fine locking grooves adapted to permit a tight fit of said platforms on said steering wheel and said coarse locking grooves providing superior strength for said device, and said first and second locking bars mounted on one of said first and said second platforms;

first and second respective receiving channels for said first and second locking bars formed on the other of said first and second platforms such that said locking bars slide in and out of said receiving channels in an unlocked mode;

a key actuatable lock mounted on said other of said first and second platforms, said lock including a rotating armature acting upon two latches which move in opposite directions respectively and mate with said fine and coarse locking grooves on said locking bars.

2. A device as claimed in claim 1 wherein said latches are disposed intermediate and normal with respect to said locking bars and are biased in one mode from the group of modes consisting of a lock mode and said unlock mode.

3. A device as claimed in claim 1 wherein said first and second platforms slide together with a tongue and groove guide system.

4. A device as claimed in claim 1 wherein said first locking bar carries circumferential coarse locking grooves and said second locking bar carries fine tooth locking grooves.

5. A device as claimed in claim 1 wherein said first locking bar has a generally cylindrical cross-sectional shape and said second locking bar has a generally rectangular shape.

6. A device as claimed in claim 1 wherein one of said first and said second platforms include a pair of spaced apart, depending pins which are adapted to capture one of said steering wheel spokes therebetween.

7. A device as claimed in claim 1 wherein said platforms are adapted to span said steering wheel hub above said air bag and each said arcuate grip member is adapted to span an arc of about 30 degrees on either side of said steering wheel.

8. A device as claimed in claim 1 wherein said first locking bar has a generally cylindrical cross-sectional shape and carries circumferential coarse locking grooves thereon and said second locking bar has a generally rectangular shape and carries fine locking grooves thereon, said fine locking grooves establishing a plurality of locking positions for each one of said circumferential coarse locking grooves.

9. A device as claimed in claim 1 including partial arc spacers, sized to fit within said semicircular wheel grip faces to accommodate steering wheels having smaller cross-sectional diameters.

10. A device as claimed in claim 2 wherein said first and second platforms slide together with a tongue and groove guide system.

11. A device as claimed in claim 10 wherein said first locking bar carries circumferential coarse locking grooves and said second locking bar carries fine tooth locking grooves.

12. A device as claimed in claim 11 wherein said first locking bar has a generally cylindrical cross-sectional shape and said second locking bar has a generally rectangular shape.

13. A device as claimed in claim 12 wherein one of said first and said second platforms include a pair of spaced apart, depending pins which are adapted to capture one of said steering wheel spokes therebetween.

14. A device as claimed in claim 13 wherein said platforms span said steering wheel hub above said air bag and each said arcuate grip member is adapted to span an arc of about 30 degrees on either side of said steering wheel.

15. A device as claimed in claim 14 wherein said first locking bar with a generally cylindrical cross-sectional shape carries said circumferential coarse locking grooves thereon and said second locking bar with a generally rectangular shape carries fine locking grooves thereon, said fine locking grooves establishing a plurality of locking positions for each one of said circumferential locking grooves.

16. A device as claimed in claim 15 including partial arc spacers, sized to fit within said semicircular wheel grip faces is adapted to accommodate steering wheels having smaller cross-sectional diameters.

17. A device as claimed in claim 4 wherein said first locking bar travels within said first receiving channel and moves with respect to said first and second platforms and includes an extension end which abuts a fixed structure in said automobile in a locked mode.

18. A device as claimed in claim 17 wherein said circumferential grooves have a lock face normal to an axial centerline of said locking bar and slope face disposed towards said extension end.

* * * * *